United States Patent [19]

Kolenik et al.

[11] 3,898,994

[45] Aug. 12, 1975

[54] FIXED-RATE PACER CIRCUIT WITH SELF-STARTING CAPABILITY

[75] Inventors: Steve A. Kolenik, Leechburg; William L. Johnson, Kittanning, both of Pa.

[73] Assignee: Arco Nuclear Company, Leechburg, Pa.

[22] Filed: Jan. 24, 1973

[21] Appl. No.: 326,473

Related U.S. Application Data

[63] Continuation-in-part of Ser. No. 109,857, Jan. 26, 1971, abandoned.

[52] U.S. Cl.... 128/419 PG; 128/419 C; 128/419 E; 128/419 G; 128/422; 307/313; 328/193; 331/113 R

[51] Int. Cl. .............................................. A61n 1/36

[58] Field of Search ...... 128/419 P, 419 PG, 419 R, 128/419 G, 419 E, 419 C, 421, 422; 331/113 R; 328/193; 307/313

[56] References Cited

UNITED STATES PATENTS

| | | | |
|---|---|---|---|
| 3,433,228 | 3/1969 | Keller, Jr. | 128/419 P |
| 3,454,012 | 7/1969 | Raddi | 128/419 P |
| 3,497,829 | 2/1970 | Rusch | 331/113 R |
| 3,547,127 | 12/1970 | Anderson | 128/419 P |
| 3,649,367 | 3/1972 | Purdy | 128/419 P |
| 3,707,974 | 1/1973 | Raddi | 128/419 P |

*Primary Examiner*—William E. Kamm
*Attorney, Agent, or Firm*—Richard A. Bachand; John R. Ewbank

[57] ABSTRACT

An electrical circuit operable from a low voltage source or nuclear battery for generating electrical pacing and stimulation pulses for application to a human heart includes a multivibrator having transistors of opposite conductivity type. Both transistors are simultaneously switched between conductive and nonconductive states, and each includes a resistor between its base and collector to prevent the transistors from remaining in saturation after pulse generation to assure that the multivibrator is self-starting. Interconnected between the base of each transistor and the collector of the other is a resistor and capacitor in series to control the duration of each pulse, and in cooperation with the base-collector resistor of each transistor to control the period between each pulse. The multivibrator pulse is amplified by a transistor amplifier and applied to a voltage doubler output circuit.

4 Claims, 10 Drawing Figures

FIGURE I

NUCLEAR BATTERY CHARACTERISTICS

FIXED-RATE PACER CIRCUIT WITH SELF-STARTING CAPABILITY

CROSS REFERENCE TO RELATED APPLICATIONS

This application is a continuation-in-part of copending U.S. Pat. No. 109,857, filed Jan. 26, 1971, by applicants herein, now abandoned.

BACKGROUND OF THE INVENTION

1. Field of the Invention

The invention relates to improvements in medical-electronic life-support systems which, when coupled to a human life system, provide current pulses which are supportive to that life system, such as pulses to stimulate the cyclic action of the human heart or analogous stimulation. The invention is particularly useful in improving heart pacer systems of the type known in the art and described below.

2. Description of the Prior Art

FIG. 1 is a schematic electronic representation of the human heart life system together with an associated support pulse-generating system or cardiac pacemaker coupled thereto in a manner known in the art, whereby heart-stimulating current pulses are provided, being powered from a particular current source. Although other sources may be suitable, the particular current source contemplated here is a radioisotope-powered thermoelectric generator, or nuclear battery, with long life and high reliability, being suitable for integration with the existing (galvanic-battery-powered) pacemaker circuits and cardiac leads operating in the microwatt electrical power range. Such a nuclear-powered cardiac pacemaker is indicated functionally in the block diagram of FIG. 2. Here, it will be seen that heat produced by the natural decay of the radioisotope plutonium-238 (source 2-1) is converted to electrical energy by a thermopile 2-2. This electrically energy is stored (stage 2-3) and periodically utilized by a multivibrator circuit 2-4 to convert the direct-current voltage to a series of voltage pulses. These voltage pulses are then converted to current pulses (stage 2-5) and transmitted to the cardiac electrode. The transmitted stimulating current is rectangular in shape and has a fixed rate.

This nuclear battery system was designed with particular objectives in mind, these being summarized in Table 1 below.

TABLE 1

System size: approximately 6 × 5 × 2.8 cm
System weight: 100g
Design life: 10-year minimum, plus 1-year shelf life
Reliability: 0.95 at 0.90 confidence
External radiation: 0.3 mrad per hour at 5 cm and 5 mrad per hour at the surface
Pacemaker electronics: Commercial
Sterilization: Capable of sterilization under hospital conditions
Nuclear battery: 160 microwatts (end of life)
Fuel: plutonium-238
System electrical output: a current pulse with the following characteristics:

1. Current: 4.0 milliamperes as a minimum, 7.0 milliamperes as a maximum onto a load consisting of a resistor that may vary between 300 and 700 ohms paralleled by a series resistor-capacitor branch of 5.0 microfarad and 1,000 ohms
2. Shape: 1.5 to 2.0 millisecond rectangular current pulse, with full recovery between pulses; the pulse must achieve full current output within 0.10 millisecond
3. Rate: 70±5 pulses per minute Electrode: monopolar The functional characteristics of this nuclear battery system (FIG. 2) are indicated in FIG. 3, schematically and in an idealized fashion. That is, FIG. 3 is a schematic of a generalized radioisotope-powered thermoelectric generator system, of which is a radioisotope-powered cardiac pacemaker is a specific example. Note that there are three major elements: (1) the heat source, which provides heat by means of the natural decay of the isotope; (2) a suitable set of thermoelectric elements, which convert the isotope heat of decay into a useful direct-current electrical output by means of the Seeback effect; and (3) and electronics package, which converts this direct current into the proper stimulating pulses. In this simplified form, the nuclear battery includes the heat source and the thermoelectrics, while the electronics package includes both the pacemaker electronics and the cardiac lead.

This system (including nuclear battery, oscillator and pacemaker electronics as coupled to the cardiac life system) in FIG. 3 represents a self-contained plutonium-fueled, thermoelectric conversion power source integration with existing commercial pacemaker electronic circuits and leads.

BRIEF DESCRIPTION OF THE DRAWING

The invention is illustrated in the accompanying drawing, wherein.

CONVENTIONAL PACEMAKER POWER ELECTRONICS

Figure 4:
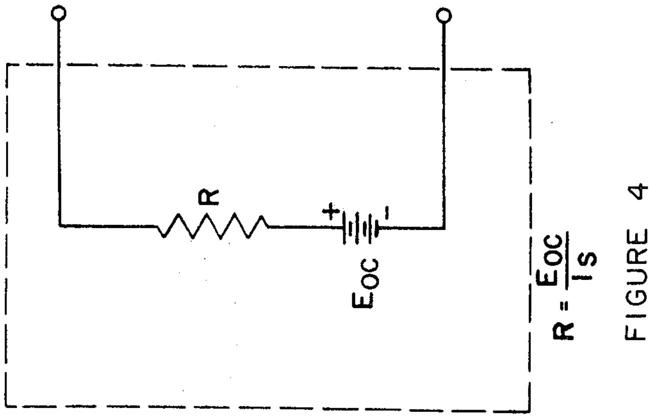
FIG. 4 is an electrical equivalent circuit of a nuclear battery of the system of FIG. 2 employed with the cardiac pacemaker, in accordance with the invention.
Figure 5:
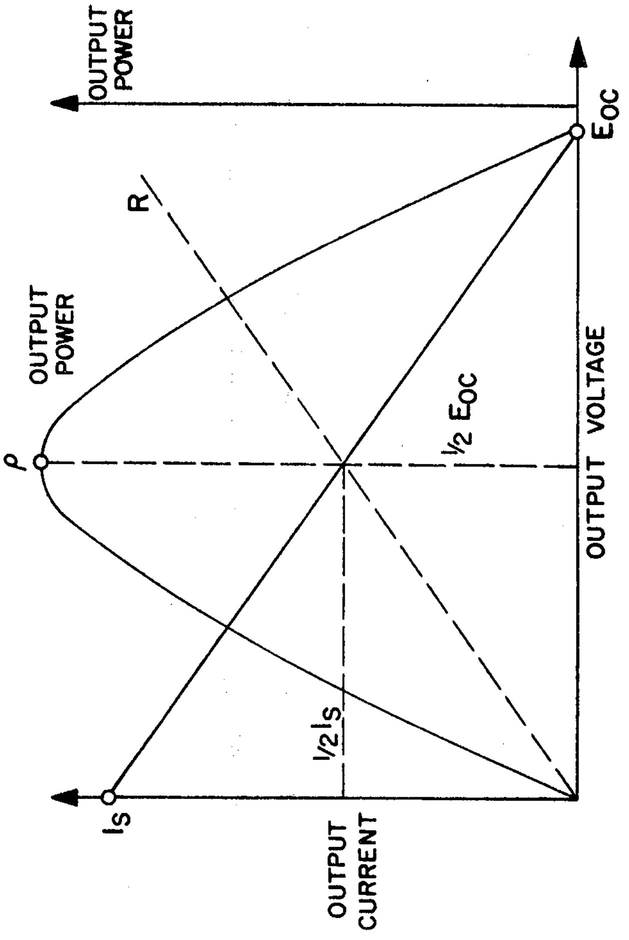
FIG. 5 is a graph of the output current versus the output voltage of the nuclear battery equivalent circuit of FIG. 4.

Existing pacemaker electronics have been designed to operate with conventional batteries. Since the output characteristics of conventional batteriies differ somewhat from those of nuclear batteries, certain component adjustments are requrired to achieve compatibility between the nuclear battery and pacemaker electronics. The nuclear battery output characteristics (load line) are shown in FIG. 5 in which the output current, output voltage, and output power are plotted. A simplified equivalent circuit of the nuclear battery is shown in FIG. 4, and includes an "ideal" *emf* in series with a resistor. The *emf* is a result of the Seebeck effect, and the resistance is the net sum of all the thermocouple wires connected within the nuclear battery, integrated over the temperature profile from their hot to cold junctions. One characteristic of such a power source is that maximum power transfer to a load connected across its terminals occurs when the load impedance equals the complex conjugate of the source impedance. For the nuclear battery, this corresponds to the load resistance being equal to the internal battery resistance (R), which is shown graphically in FIG. 5. Any operating point on the load line with a given resistive load is determined by the intersection of the load line and the voltage versus current curve of the resistor, which is a straight line through the origin with a slope numerically equal to the conductance. If the value of the load resistance becomes very large, the nuclear battery output voltage approaches the open-circuit value ($E_{oc}$), and the output current and power approach zero. If the value of the load resistance becomes very small, the output current approaches its short-circuit value ($I_s$), and the output voltage and power approach zero.

Two important points illustrated by FIG. 5 are: (1) the nuclear battery output voltage is a function of the load, in contrast to conventional batteries for which the output voltage is relatively constant over a wide range of loads; and (2) the maximum output current of the nuclear battery is limited to its short-circuit value. It is, therefore, important in designing nuclear-powered devices that the internal resistance of the nuclear battery match reasonably well the equivalent resistance of the electronics powered by the nuclear battery. In addition, if large pulses of current (much larger than $I_s$) are required, a storage device, such as a capacitor, must be utilized.

Figure 1:
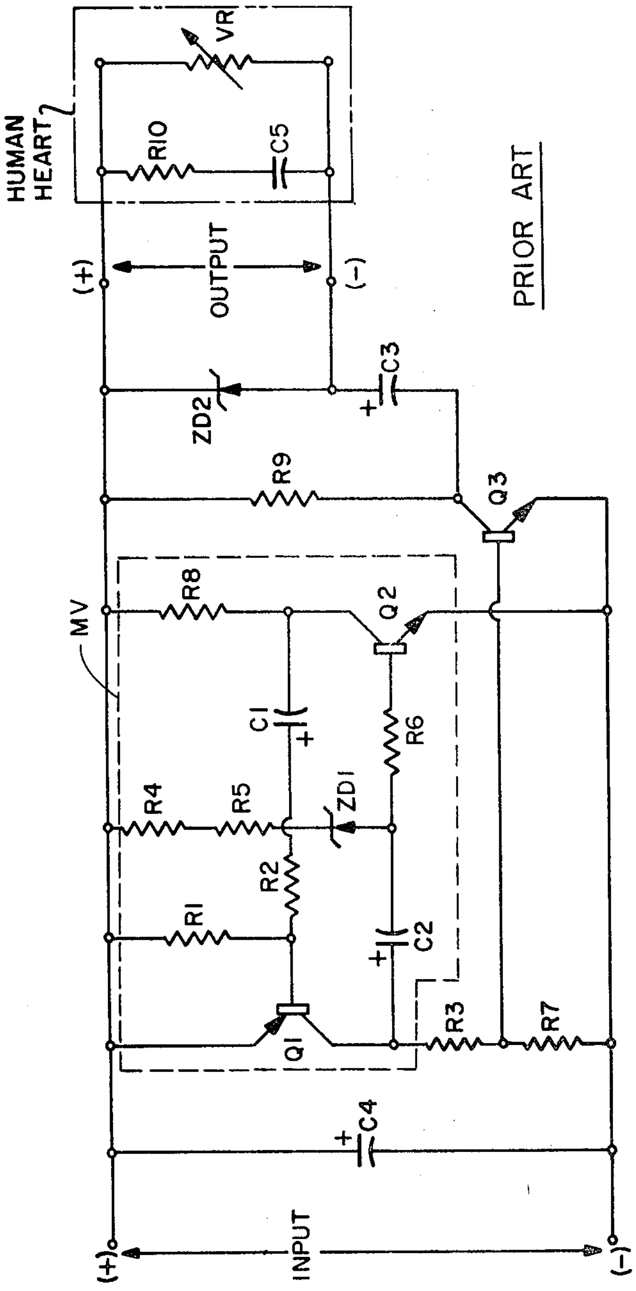
FIG. 1 is an electrical schematic diagram of a prior art pulse generating circuit.
Figure 2:
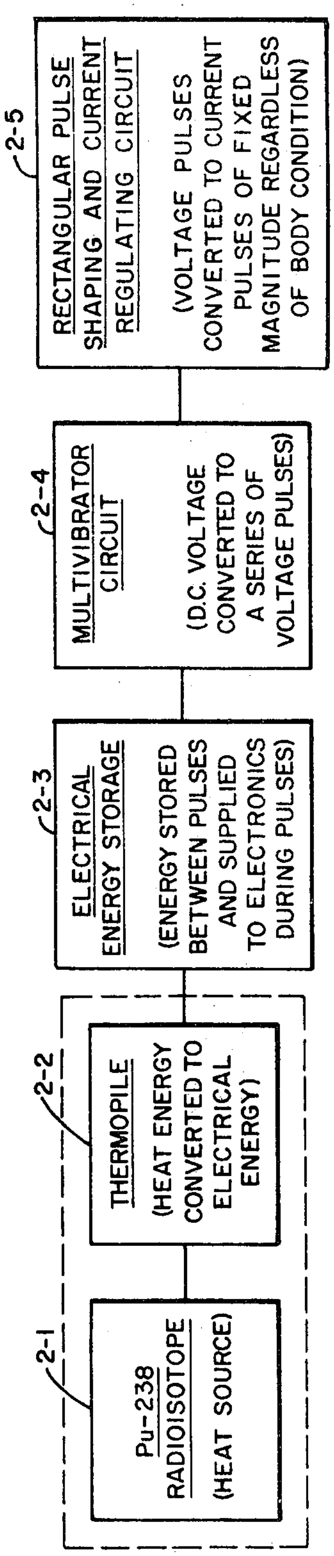
FIG. 2 is a block diagram illustrating generally the arrangement of a nuclear powered cardiac pacemaker.
Figure 3:
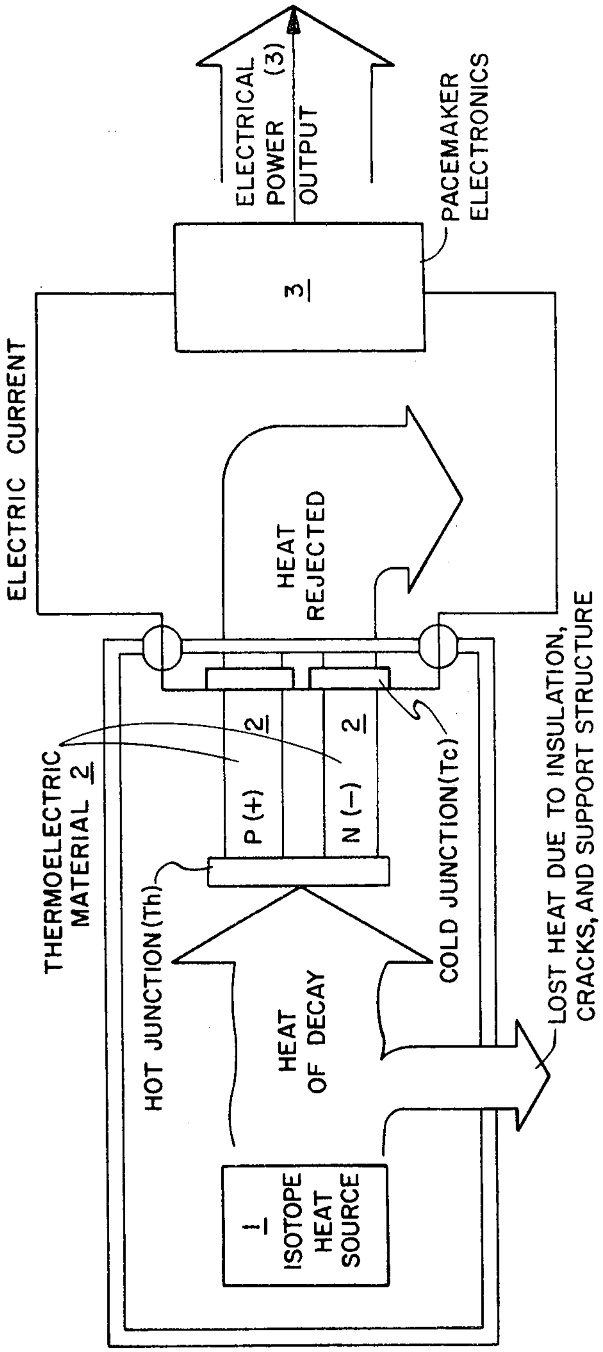
FIG. 3 is a diagrammatic illustration of a radioisotope powered thermoelectric generator system for use as a part of the cardiac pacemaker system of FIG. 2.

FIG. 1 shows a fixed-rate, cardiac pacemaker circuit comprising two transistors (Q1 and Q2) connected in a complementary pair as a free-running multivibrator whose output is fed to a third transistor (Q3). Transistor Q3 assures that the output to the heart is a current pulse (as distinguished from a voltage pulse) and regulates the pulse-wave shape. In this configuration, the transistors draw current from the power supply only during application of the output pulse to the heart. Transistors Q1 and Q2 freely oscillate with an on-time determined by the product of the capacitance value of the capacitor C1 and resistance of resistor R2. The off-time of Q1 and Q2 is determined primarily by the product of the capacitance C2, the resistance of R5 and zener diode ZD1. The amplitude of the output-current pulse is determined by the $\beta$ (forward current gain in the common-emitter configuration) of Q3 and the resistance of R3. In order to completely block direct-current energy to the heart, capacitor C3 is connected between the output and the electrode. The zener diode, ZD2, shunts any extraneous high voltage signals that might be introduced by external defibrillation or other high voltage shock procedures applied to the patient.

The basic circuit shown in FIG. 1 is not operative when supplied by the nuclear battery unless certain minor adjustments are employed. Between pulses, for example, the electronic circuit draws almost no current, whereas during the pulse it draws a large current amplitude, much greater than $I_s$ in FIG. 4. Therefore, the operating point would be at $E_{oc}$ before the pulse, and the nuclear battery voltage would drop to zero during the pulse, which cannot be permitted. However, with the addition of a suitable capacitor (C4) across the output terminals of the nuclear battery, this difficulty is eliminated. Between pulses, the capacitor is charged by the nuclear battery, and during the pulse, current is drained from the capacitor, inducing its voltage to decrease. During continuous pulsing, the voltage decrease equals the voltage increase, so that the nuclear battery output voltage oscillates about a given point on the load line of FIG. 5. The capacitor thus supplies the large energy pulses for short periods of time, while the nuclear battery replenishes the energy in the capacitor over the relatively long periods of time between pulses. The magnitude of the voltage oscillation is dependent upon the size of the capacitor (in addition to the pulse width, rate, amplitude, and battery resistance), which should have a large value since excessive wave-shape distortion takes place if the supply voltage decreases too much during the pulse. In addition to this storage capacitor (C4), some of the circuit parameters must be adjusted since the supply voltage oscillates.

In general the system would normally be designed to oscillate about the peak power point (point $\pi$ in FIG. 5). However, since the nuclear batteries produce more power than is required by most fixed-rate pacer circuits, the system oscillates about a point corresponding to a higher output voltage but lower output power from the nuclear battery than point $\pi$ in FIG. 5.

Some of the problems presented by the prior art system discussed above, are the absence of a "self-starting" capability and the lack of a reliable power-level indicator means. That is, the multivibrator stage (MV) indicated in FIG. 1 is subject to stoppage, or "nonstarting," in the event of momentary interruption. Also, this multivibrator fails to provide a reliable indicator of the input voltage level (i.e. condition of nuclear battery) to, for instance, track the deterioration of its power output and thereby provide an early warning of device failure. It is arranged so that the pulse rate should roughly indicate the input voltage level; however, this rate is not very reliable, as it can vary with temperature and with various circuit parameters. Features of the invention are to remedy these problems by providing an improved pulse generating system having a self-starting capability, and to provide a pulse rate that reliably indicates the supply voltage level. These features also make circuit operation relatively independent of drifting in (component) parameter values, of leakage and of ambient temperature variations.

OBJECTS

Accordingly, it is an object of the present invention to provide an improved life-support pulse generating system having greater reliability and versatility than systems heretofore. It is another object to provide such systems having a self-starting capability. A related object is to provide such systems having a pulse output which reliably indicates supply voltage condition and is rate sensitive. Such a system is relatively unaffected by component variations and by drift caused by component leakage or temperature variations.

DEETAILED DESCRIPTION OF THE PREFERRED EMBODIMENTS

Figure 6:
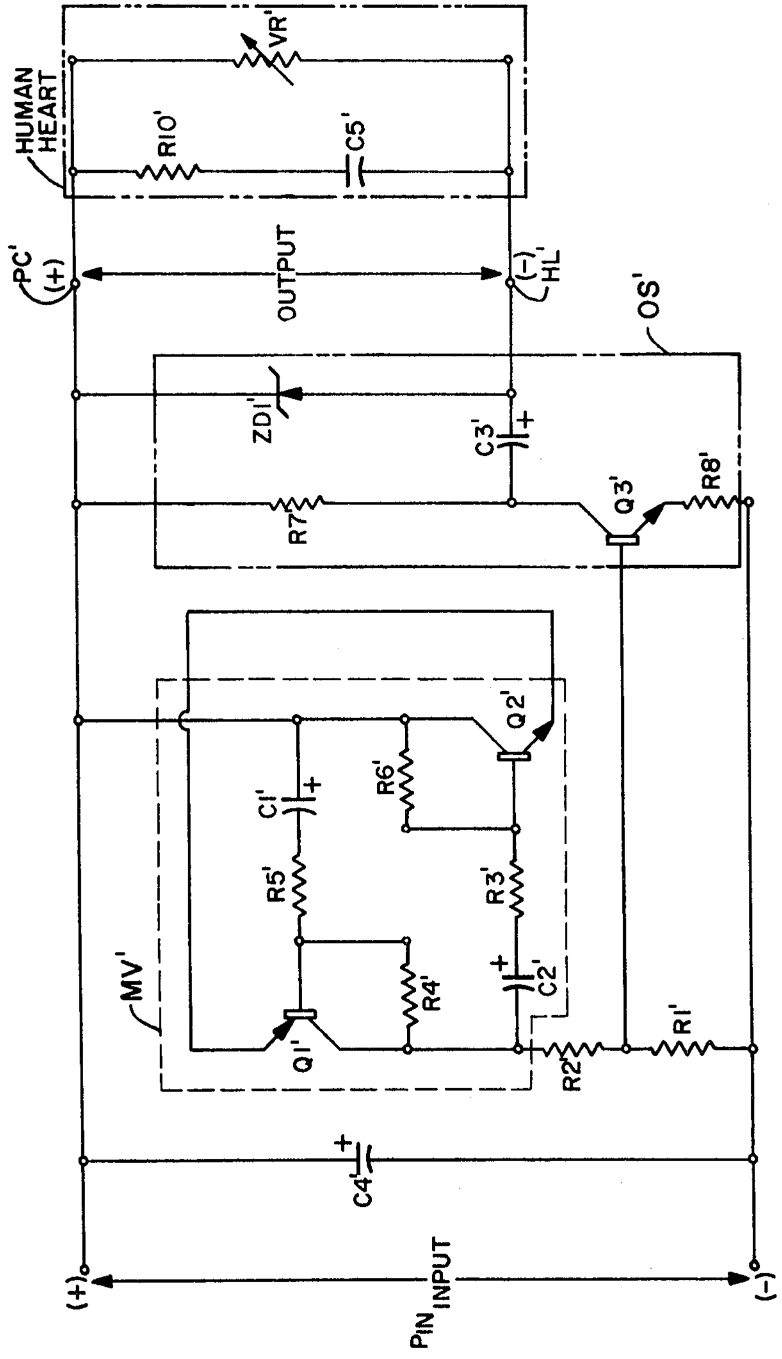
FIG. 6 is an electrical schematic diagram of a pulse generating circuit, in accordance with the principles of the invention.

As one embodiment of the invention, attention is called to FIG. 6 and the following related description of an improved version of the system in FIG. 1, it being assumed that FIG. 6 is the same as FIG. 1 except where hereinafter indicated. The ratings and/or type indicia of the components of FIG. 6 are summarized in Table 5, as follows:

Table 5

| | | |
|---|---|---|
| Q1' | SM2N2907A | (Transistor) |
| Q2' | SN2222A | (Transistor) |
| Q3' | SN2222A | (Transistor) |
| ZD1' | SIN756A | (Diode) |
| C1' | 50V, .082 MFD | (Capacitor) |
| C2' | .082 MFD,50V | (Capacitor) |
| C3' | 20V,15 MFD | (Capacitor) |
| C4' | 10V,39 MFD | (Capacitor) |
| R1' | 4.7K(ohms) | (Resistor) |
| R2' | 11K (ohms) | (Resistor) |
| R3' | 5.1K(ohms) | (Resistor) |
| R4' | 15M (ohms) | (Resistor) |
| R5' | 5.1K(ohms) | (Resistor) |
| R6' | 15M (ohms) | (Resistor) |
| R7' | 10K (ohms) | (Resistor) |
| R8' | 180 (ohms) | (Resistor) |

The characteristics and operating mode of the system in FIG. 6 will be described. The object is, of course, to provide a current pulse generating system of maximum efficiency that is both self-starting and "self-monitoring"; that is, whose pulse rate is proportional to supply voltage level. Maximum efficiency, of course, facilitates a smaller power source, thus reducing size, weight and cost of the nuclear source; as well as reducing the emanating dose rate. Self-starting assures that the system will not be prematurely interrupted; self-monitoring provides a pulse rate that is proportional to the supply voltage and assures that an excessive rate cannot develop as supply voltage degrades (that is, no "runaway" can occur — something to which many present-day devices are subject).

The solution to these problems utilizes a multivibrator circuit consisting of a pair of transistors which alternately conduct and shut off as the multivibrator switches state — its output feeding an output transistor stage which, in turn, applies an amplified-current pulse to the heart. This approach, however, has several imperfect aspects. In some such systems, power is subject to being dissipated unnecessarily since one transistor is always conducting.

However, in other related systems (here see the relevant aspects of the circuit in FIG. 1) the pulse generating circuit is subject to unreliable starting, since if both transistors are saturated and quiescent, oscillation initiation requires the application of an external signal (loop gain being less than unity, Barkhausen's condition is violated). Again, once such a circuit is started, if it should be momentarily interrupted, such as by an impinging RF field, it might not recover and restart. Some other circuits are problematical in that the pulse rate increases considerably as the supply voltage level decreases and can present a hazard to the patient.

The systsem shown on FIG. 6 does not have the aforementioned disadvantage of conducting continuously, rather it switches each transistor ON only during a minor portion of the oscillation cycle; and, since the conducting time is relatively short, the average power dissipated is much less than if a transistor were continually conducting. Also the "duty-cycle" of both transistors is greatly reduced.

In contrast to the circuit of FIG. 1, it should be noted that other prior solutions have utilized a multivibrator circuit consisting of two identical transistors which alternately conduct and turn off as the multivibrator switches from one state to the other. The output of the multivibrator then feeds an output transistor stage which amplifies the current which is transmitted to the heart. This approach has several unsatisfactory aspects. Since one device is always conducting a large amount of power is consumed. Also this circuit is characterized by unreliable starting, since, if both transistors are saturated and in a quiescent state, Barkhausen's condition is violated (loop gain is less than unity) and an external signal is required to start oscillation. If such a circuit once started should be momentarily stopped (by an impinging RF field for example), it would not recover. Another disadvantage is that the pulse rate becomes greater as supply voltage decreases which can cause damage to the patient.

The circuit of FIG. 1 has partially solved such problems by making one of the multivibrator transistors PNP and the other NPN (opposite conductivity). Thus both conduct at the same time for a small portion of the cycle and are turned off for the remainder of the cycle. Since the conducting time is very short compared to the nonconducting time, the average power is much less than when one transistor is always conducting. In addition, the pulse rate in this circuit (FIG. 1) is made proportional to supply voltage by zener diode ZD1.

As mentioned, a disadvantage of this circuit is its unreliable starting characteristics similar to prior solutions. A further disadvantage is that the method of achieving rate/voltage sensitivity is unreliable.

The features taught in FIG. 6 provide a solution to these problems with a multivibrator circuit wherein no base to emitter resistors are used and wherein a biasing resistor is inserted between the base and collector of both transistors - thus, they cannot be saturated in the quiescent state and will accordingly be self-starting. Additionally, all three transistors are ON for only a fraction of the oscillating cycle, thus minimizing power consumption. Furthermore, the output transistor Q3' in FIG. 6 is designed to operate in a dual-mode: both as current amplifier and as a series current regulator. This insures that the output current pulse shape is rectangular. Also, output pulse rate is arranged to decrease with decreasing supply voltage, thus obviating any runaway.

In contrast to the circuits previously mentioned, it should be pointed out here that the multivibrator of FIG. 6 is composed of two symmetrical halves and that these two halves tend to operate in parallel in controlling both pulse rate and pulse duration. Because of this parallel action, output parameters are much less sensitive to individual circuit component drifts. For example, in previous circuits half of the multivibrator controls rate and the other half controls width. Thus for a two-fold decrease in the rate capacitor the pulse would increase by a factor of two. However, for the circuit of FIG. 6, the same change in capacitance results in a much less increase in pulse rate.

The power input, $P_{in}$, comprises the output from a nuclear battery of the type described above, and may be understood to provide on the order of 6 volts and 50 microwatts. Input power is coupled to the multivibrator stage MV' through supply storage capacitor C4', which will be understood to be periodically drained by stage MV' and thereafter resupplied from the battery output $P_{in}$. Multivibrator MV' is thus supplied by a high-impedance source and operates relatively conventionally except as hereinafter indicated. Transistors Q1' and Q2' (specified as PNP, NPN, respectively) are each supplied with a base-collector resistor, R4' and R6', respectively. The pulse rate is tailored according to the "R-C time constant" imposed by C1'-R4' and C2'-R6', respectively. The pulse duration can be controlled according to the magnitude of resistors R5' and R3', respectively. The output stage OS'comprises comprises output transistor Q3', which is capacitively coupled to the heart lead (terminal HL') providing an amplified and regulated current output pulse to HL', referenced to the relatively positive reference potential of the device casing indicated schematically at terminal PC'. The emitter resistor in Q3' helps to regulate the output current and makes operation relatively independent of variations in Q3' values. A shunting resistor R7' is coupled between the casing and Q3' collector, serving as a substitute load in open-circuit condition (where the body impedance, typically about 500 ohms, is not coupled in as a load). Capacitor C3' serves to isolate the body from any DC current which would deleteriously polarize the cardiac electrode, leading to corrosion, etc. A shunting zener diode ZD1' is shunted across the circuit output and connected to shunt the high level (in excess of 8 volts) fibrillation pulses, thus preventing damage to the electronics.

In the operation of the multivibrator MV', it will be recognized that the current pulse from the supply capacitor C4' will charge the capacitor C1' to drive the base of the transistor Q1' relatively negative and into a forward biased condition (so as to switch it ON or conducting), and in turn, charge the capacitor C2' to drive the base of the transistor Q2' to a positive (forward-biased) condition, thus switching Q2' ON. The base of the transistor Q1' then proceeds to be driven less negative and switches OFF, thereafter switching Q2' OFF to complete a cycle — and automatically begin a new cycle as C1' is again recharged. Note that resistors R4' and R6' allow the circuit to be self-starting, in that they will assure that a capacitor such as C1' is, in time, charged sufficiently to switch the transistor Q1' ON, even in an instance where the input power $P_{in}$ is interrupted temporarily. The level of the output current may be adjusted according to the magnitude of the resistors R2' and R1' and the emitter resistor R8'.

The rate sensitivity will also be seen as being very reliably provided; i.e. as the level of input voltage $P_{in}$ drops, the circuit will responsively modify the output pulse frequency by virtue of the change in ratio of supply voltage to the collector-base-emitter voltages (sum) of Q1 and Q2. These voltages are extremely stable as opposed to other systems wherein a zener diode is used and operated below its characteristic "knee" — thus being quite unstable and too dependent on operating current values.

Figure 7:
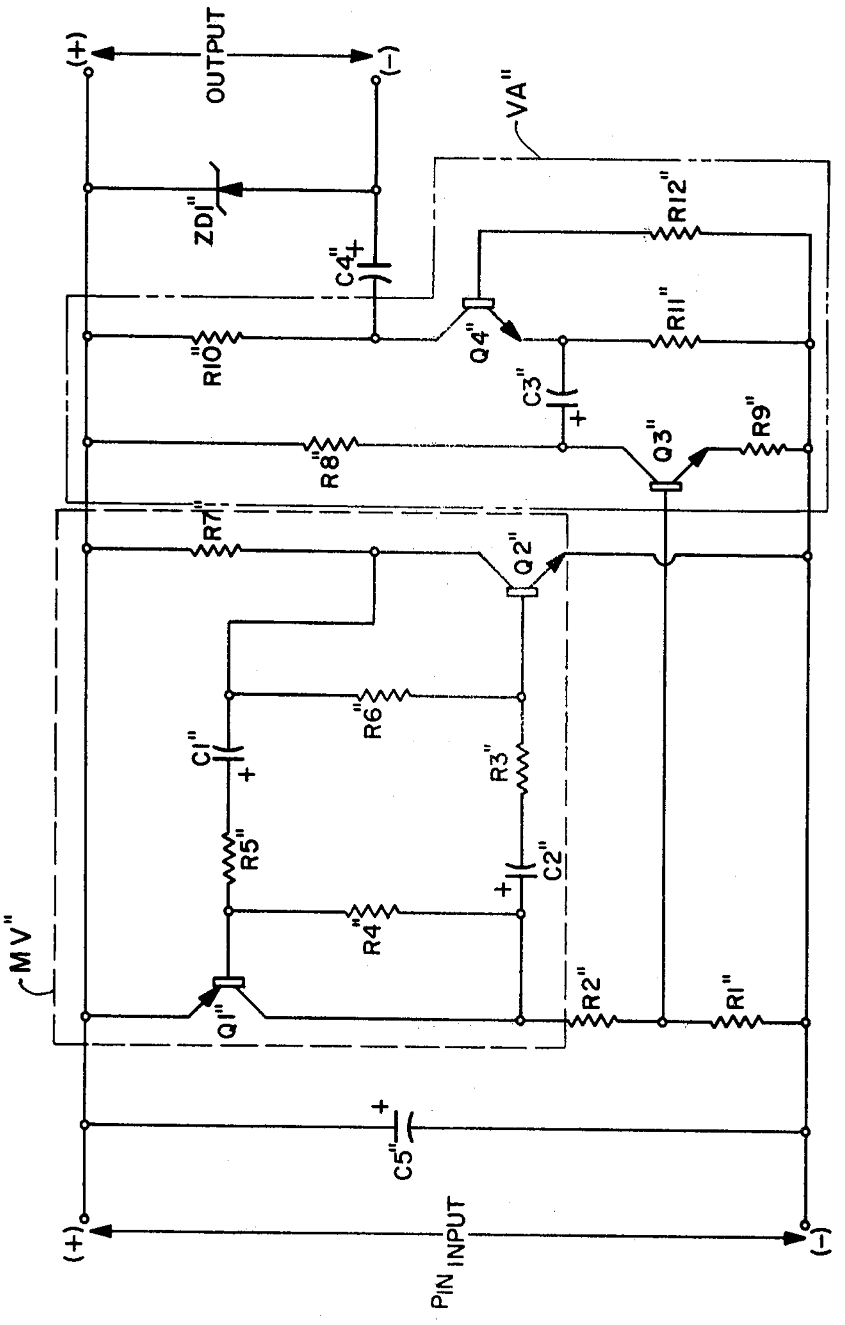
FIG. 7 is an electrical schematic diagram of another preferred embodiment of a pulse generating circuit, in accordance with the principles of the invention, using a capacitance voltage doubling output circuit.

FIG. 7 represents a modified version of the system of FIG. 6, described above, modified according to the invention to accept lower input voltage (constant power), compensatorially amplifying output power. This circuit also exhibits decreased rate sensitivity with a drop in input voltage but exhibits about the same magnitude of rate sensitivity as a function of power amplitude, since power is the same in all such systems while voltage levels may differ. The circuit of FIG. 7 will be assumed the same as that in FIG. 6, except where otherwise indicated hereinafter. The ratings and/or identification for each of the components in FIG. 7 are tabulated in Table 6, as follows:

Table 6

| | | |
|---|---|---|
| Q1'' | SM2N2907A | (Transistor) |
| Q2'' | SN2222A | (Transistor) |
| Q3'' | SN2222A | (Transistor) |
| Q4'' | SN2222A | (Transistor) |
| ZD1'' | SIN756A | (Diode) |
| C1'' | .47 μ FD,50V | (Capacitor) |
| C2'' | .47 μ FD,50V | (Capacitor) |
| C3'' | 39 μ FD,10V | (Capacitor) |
| C4'' | 39 μ FD,10V | (Capacitor) |
| C5'' | 10V,120MFD | (Capacitor) |
| R1'' | 2.2K (ohms) | (Resistor) |
| R2'' | 1.0K (ohms) | (Resistor) |
| R3'' | 1.1K (ohms) | (Resistor) |
| R4'' | 2.4M (ohms) | (Resistor) |
| R5'' | 1.1K (ohms) | (Resistor) |
| R6'' | 2.4M (ohms) | (Resistor) |
| R7'' | 3.3K (ohms) | (Resistor) |
| R8'' | 4.7K (ohms) | (Resistor) |
| R9'' | 47 Ω (ohms) | (Resistor) |
| R10'' | 10K (ohms) | (Resistor) |
| R11'' | 4.7K (ohms) | (Resistor) |
| R12'' | 27K (ohms) | (Resistor) |

The pulse generating systsem in FIG. 7, as mentioned, includes an output voltage pulse "doubler" (voltage amplifier stage VA''). Stage VA'' comprises an output transistor Q3'', generally analogous to the output transistor indicated in FIG. 6 above, which is capacitively coupled to the emitter of a doubling transistor Q4'' through an output charging capacitor C3''. Q4'', in turn, has its collector coupled to the isolating capacitor C4'' to provide the DC-isolated output before mentioned. The base and emitter of Q4'' are coupled to the negative input terminal through base resistor R12'' and emitter resistor R11'', respectively. Also, transistor Q3'' has its emitter coupled to this negative input terminal through emitter resistor R9'', as in FIG. 6 (called R8' there), which helps to regulate output, making current gain and stage input impedance relatively independent of variation in Q3'' characteristics. As mentioned, the circuit of FIG. 7, while operating to provide relatively the same output pulse as the system in FIG. 6, has the further advantage of being operable from a much lower input voltage and, for instance, can be operated from a pair of mercury batteries (2.70 volts) in series, or from two such series sets of paralleled mercury batteries (as opposed to four mercury batteries in series). It can also be powered by sources such as thermoelectric tapes (converting radioisotopic heat to electric power, as known in this art) providing an input voltage of about one to two volts. Workers in the art will recognize the reliability gained by, for instance, being able to operate with a power source comprising two pairs of parallel mercury batteries connected each pair in series with the other — as opposed to four series-connected sources, the interruption of any one of which would, of course, drop input voltage to zero and thus cause the system to fail. One "radioisotopic heat to electric power" source used advantageously comprises 88 Cupron Special/Tophel Special thermocouples connected in series to produce approximately one volt "open circuit." When thermocouple tapes are used, for instance, two series sets of three parallel-connected tapes or three series sets of two parallel-connected tapes, each are contemplated as being provided to produce approximately two and three volts open circuit, respectively.

Turning to some particulars in the operation of the circuit of FIG. 7 and the peculiar characteristics thereof, the output voltage doubler stage VA'' operates in the following manner. Transistor Q3'' operates in the manner generally described before, except that with a lower input voltage being provided, the resistance of base resistor R1'' may be reduced whereby the base-collector leakage current generates less forward-bias. The emitter resistor R9'' is provided in this embodiment to compensate for any drift in transistor gain by "swamping them out" (e.g. caused by temperature variations or various discrepancies in transistor production). Between stimulating current pulses, capacitor C3'' is charged to the supply voltage through resistors R8'' and R11''. Then, when Q3'' is turned on by the multivibrator MV'', the voltage across C3'' is impressed in series with the supply voltage. Thus, the output presents a voltage whose magnitude is approximately twice that of the supply voltage during the stimulating pulse. The capacitance of C3'' is made large enough so that it is effective during the relatively brief stimulation pulses, assuming low current levels (less than 2 percent of the initial voltage of C3'' being lost during the pulse).

Figure 8:
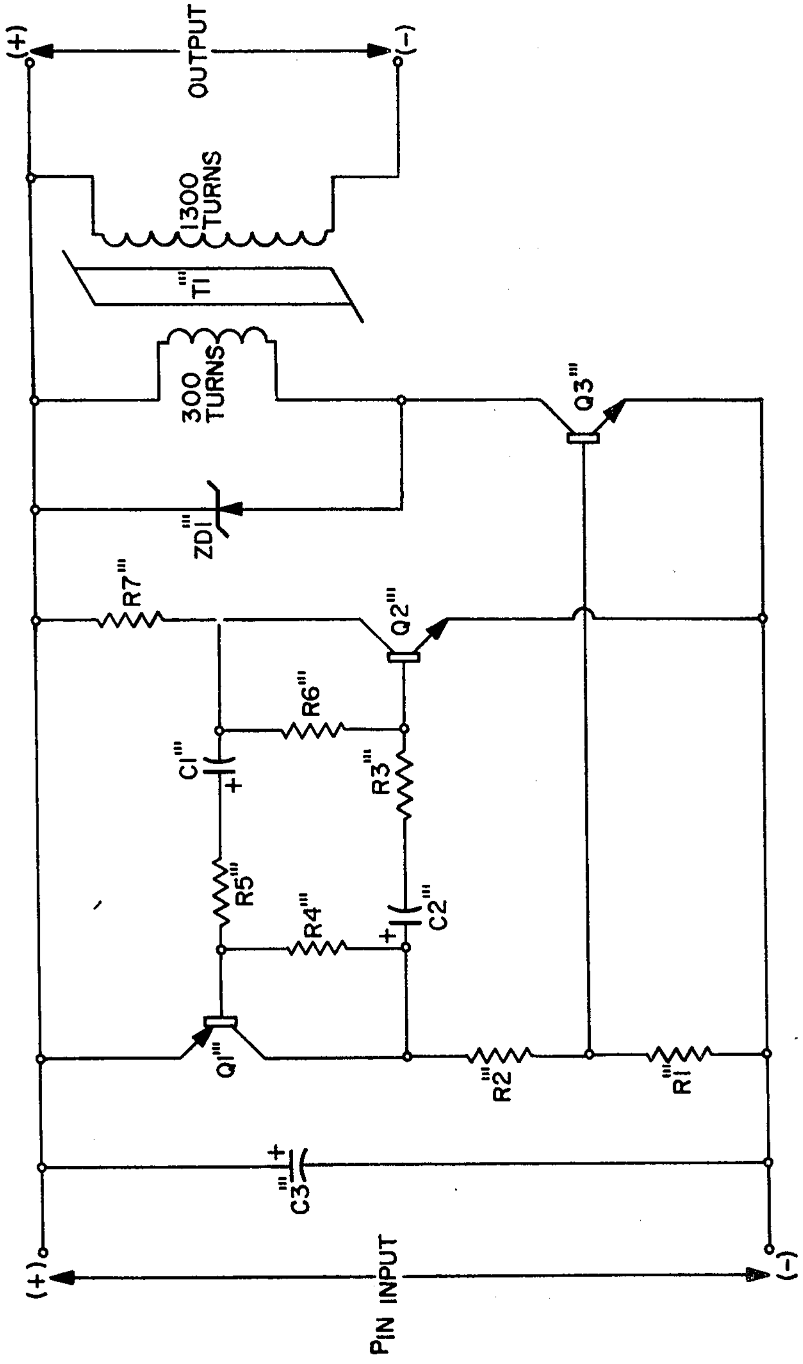
FIG. 8 is an electrical schematic diagram of another preferred embodiment of a pulse generator, in accordance with the invention, using a transformer voltage multiplier output circuit.

FIG. 8 represents a further modification off FIG. 6, essentially substituting an output (step-up) trransformer T1''' to achieve voltage multiplication in place of the voltage doubler in FIG. 7. Except where hereinafter noted, the characteristics and performance of FIG. 8 will be assumed to be the same as that of FIG. 6. The ratings and/or type identification of the components in FIG. 8 are tabulated in Table 7, as follows:

Table 7

| | | |
|---|---|---|
| Q1''' | SM2N2907A | (Transistor) |
| Q2''' | SM2222A | (Transistor) |
| Q3''' | SM2222A | (Transistor) |
| ZD1''' | SIN756A | (Diode) |
| T1''' | No. 50176-2F (300/1300) | (Transformer) |
| R1''' | 47K (ohms) | (Resistor) |
| R2''' | 1.8K (ohms) | (Resistor) |
| R3''' | 1.5K (ohms) | (Resistor) |
| R4''' | 2.4M (ohms) | (Resistor) |
| R5''' | 1.5K (ohms) | (Resistor) |
| R6''' | 2.4M (ohms) | (Resistor) |
| R7''' | 4.7K (ohms) | (Resistor) |
| C1''' | .47 $\mu$ FD,50V | (Capacitor) |
| C2''' | .47 $\mu$ FD,50V | (Capacitor) |
| C3''' | 180 $\mu$ FD,6V | (Capacitor) |

This pulse generator is functionally similar to that indicated in FIG. 7 and can operate at even lower voltages (e.g. the order of one volt; using two or more mercury batteries in parallel or two or more thermocouple tapes in parallel). Of course, introduction of transformer T1''' eliminates the need for an output capacitor, since "DC-isolation" is already achieved. Further, because of the step-down voltage action (back voltage from secondary to primary windings due to heart fibrillation), the shunting zener diode ZD1''' can operate more effectively and protect against larger induced voltages than before. Again, the pulse rate sensitivity to power variations is the same as in relatively conventional systems even though the operating voltage is much lower. Further, the ratio of pulse rate to power is the same in both type systems even though the applicable voltage operating ranges are different.

Figures 9, 10:
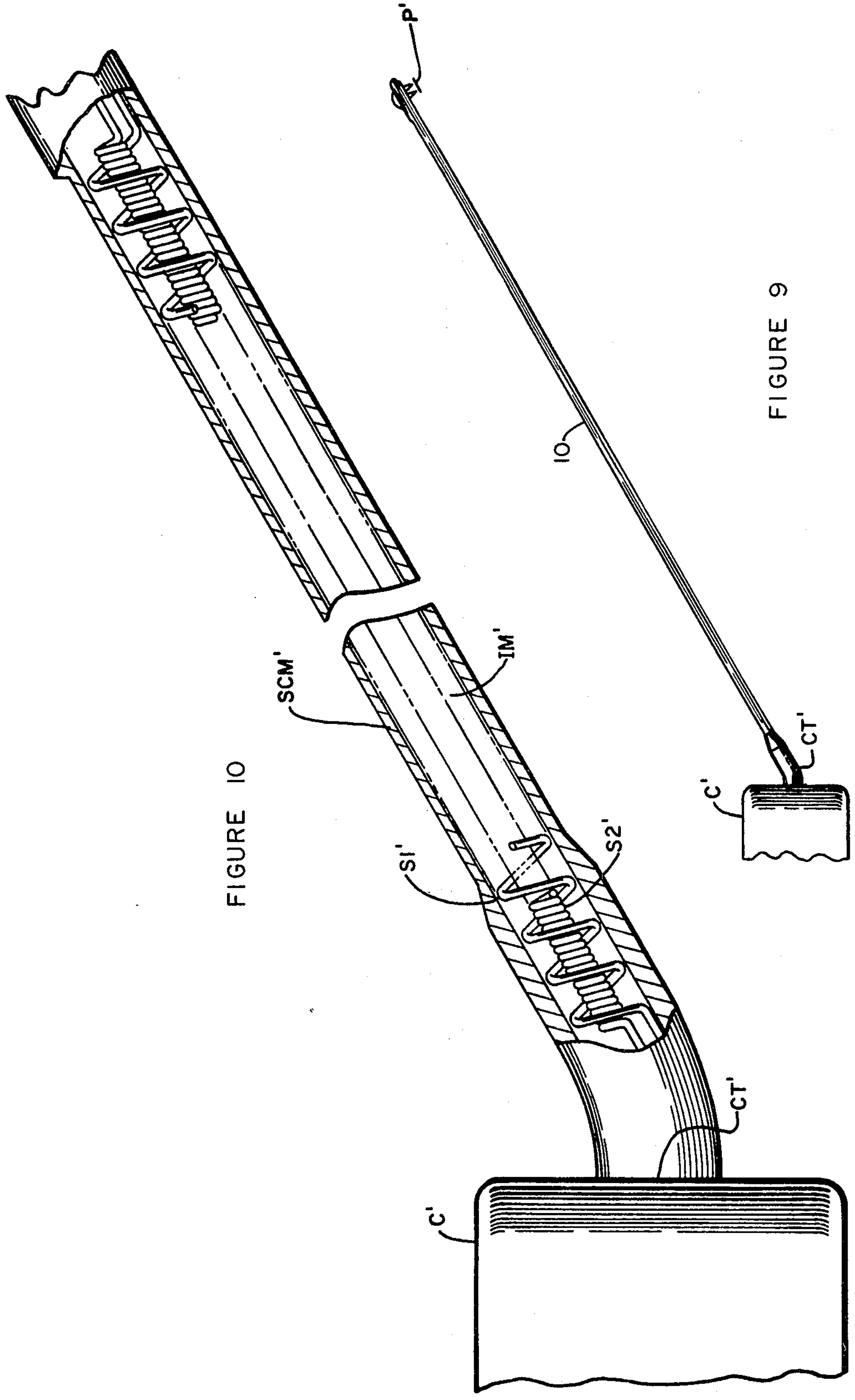
FIG. 9 is a side elevational view of a heart lead arrangement to which pulses generated by the circuits of FIGS. 6–8 are applied to the heart.
FIG. 10 is a side elevational view, partly in cross section of the lead of FIG. 9.

Another problem with present-day cardiac pacemaker systems involves the "heart leads" used, these being typically constructed in a specially wound monopolar lead configuration and susceptible to interference pulses from inductive "pick-up". Such a lead will be understood as functioning in the manner of a radio receiver antenna, tending to pick up certain EMI frequencies which can cause an undesirable interruption in certain types of cardiac pacemakers. To date workers have tried to solve this problem by providing capacitive feedthrough between a heart lead and ground, to thereby shunt such pick-up pulses from the pulsegenerating system. This, of course, can add considerably to the cost and complexity of the system, and for other reasons is not very desirable. However, a more desirable solution to this problem has been found, as is indicated in FIG. 9, by constructing the heart lead in a prescribed improved manner. Here, heart lead 10 is connected between the output terminal CT' of the electronic package housed in a pacer casing C' and the probe terminal P' to be surgically implanted in the heart for presenting the stimulation pulses thereto, as known in the art. As shown in FIG. 10, lead 10 comprises a pair of concentric springs, S1' and S2', wound concentrically but in opposite directions and electrically insulated from one another — for instance, being plotted "Silastic," (a trade name, General Electric Co.) or like insulating means, IM'. The outer spring S1' carries the stimulating current in one direction, presented at probe P', while the inner spring S2' carries the stimulating current in the opposite direction also being presented at Probe P'. The spring form of construction insures good resistance to mechanical breakage, and enhances ruggedness. As one example of construction, the indicated lead 10 is shown in the cross-sectional view of FIG. 10 as being inserted in a Silastic tube IM', which is then in turn inserted into the middle of the outer spring S1'. This entire unit can then be molded into a solid Silastic cylinder SCM' (indicated in phantom). Standard techniques can be used to form the distal (or probe) end P' of this lead and the terminal ends, as known in the art.

Various biomedical applications for current pulse generators of the type described herein, besides those referred to, will be envisioned by those skilled in this art; for instance, to develop pulses for use in: phrenic nerve stimulation; diaphragm stimulation; control of sphincter or bladder muscles; angina pain suppression, and nerve amplifier for cases involving severed spinal cords or other nerve bundles in paralyzed patients.

What is claimed is:

1. A heartpacer apparatus for generating electrical pulses from a constant voltage source for delivery to a pair of electrodes at least one of which is adapted to be connected to a heart to stimulate the heartbeat thereof, comprising:

a pair of transistors of opposite conductivity type, each having an emitter, base, and collector, the emitter of one transistor and the collector of the other transistor being connected to one terminal of said constant voltage source, and the collector of said one transistor and the emitter of said other transistor being connected to another terminal of said constant voltage source.

a pair of first resistance means, each having the same value, each connected between the base and collector of a respective one of said transistors, the value of each of said first resistance means being selected to normally bias the respective transistor to which said first resistance means is connected to a state out of saturation, and a pair of second resistance means, each having the same value, and a pair of capacitance means, each having the same value, one of said second resistance means and one of said capacitance means being connected in series between the base of one of said transistors and the collector of the other transistor, and another of said second resistance means and another of said capacitance means being connected in series between the base of said other transistor and the collector of said one transistor, whereby said first and second resistor means and said capacitance means define a multivibrator with said transistors for generating electrical pulses, said first resistance means assuring that the transistors are quiescently unsaturated and that the multivibrator is self-starting, and said second resistor means and said capacitance means controlling the duration of each pulse generated, and, in cooperation with said first resistance means, controlling the period between pulses.

2. The apparatus of claim 1 further comprising an amplifier connected to a collector of one of said transistors to receive the pulses generated by said multivibrator for delivery to said electrodes.

3. The apparatus of claim 2 wherein said voltage source is of low voltage less than about 2.70 volts, and further comprising a capacitor in parallel with said low voltage source, and a voltage doubling means comprising a load resistor, a transistor having a base, emitter and collector, the collector-emitter circuit being connected in series with said load resistor, the series being connected across the constant input voltage, and the pulses being applied to the base, and a capacitor connected between the output of said amplifier and the emitter of said transistor.

4. Apparatus for generating and applying cardiac stimulation pulses, comprising;

a nuclear battery having first and second terminals, a capacitor connected between said terminals of said nuclear battery to receive electrical charge from said battery, a PNP transistor, having an emitter, base, and collector, the emitter being connected across said first terminal and the collector being connected across said second terminal of said battery, an NPN transistor, having an emitter, base, and collector, the emitter being connected across said second terminal and the collector being connected across said first terminal of said battery, two circuits, each comprising a resistor and capacitor in series, the resistors of each said circuits being of equal value and the capacitors of each said circuits being of equal value, each circuit connected between a base of a respective one of said transistors and the collector of the other to form with said transistors a pulse generating multivibrator, first and second resistor means, each of equal value, and each connected between the base of a respective transistor and its collector, for preventing the transistors from remaining in a saturated state, to assure that the multivibrator is self-starting, a voltage doubler circuit to which the pulses of said multivibrator are applied to produce electrical pulses, and an amplifier to which the voltage doubled pulses are applied, and a pair of electrical conductors at least one of which is connectable to a person's heart to which the amplified pulses are applied for cardiac stimulation.

* * * * *